United States Patent
Wang et al.

(10) Patent No.: US 8,848,661 B2
(45) Date of Patent: Sep. 30, 2014

(54) USER EQUIPMENT AND METHOD OF USER EQUIPMENT FOR RECEIVING DOWNLINK DATA

(75) Inventors: Jian Wang, Shenzhen (CN); Yincheng Zhang, Shenzhen (CN); Meifang He, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 337 days.

(21) Appl. No.: 13/146,568

(22) PCT Filed: Sep. 11, 2009

(86) PCT No.: PCT/CN2009/073882
§ 371 (c)(1),
(2), (4) Date: Jul. 27, 2011

(87) PCT Pub. No.: WO2010/105467
PCT Pub. Date: Sep. 23, 2010

(65) Prior Publication Data
US 2011/0286416 A1  Nov. 24, 2011

(30) Foreign Application Priority Data
Mar. 17, 2009  (CN) .......................... 2009 1 0128998

(51) Int. Cl.
*H04W 36/00*  (2009.01)
*H04L 1/18*  (2006.01)
(52) U.S. Cl.
CPC ................................... *H04L 1/1838* (2013.01)
USPC .......................................................... 370/331
(58) Field of Classification Search
None
See application file for complete search history.

(56) References Cited

U.S. PATENT DOCUMENTS 7,266,105 B2  9/2007  Wu
7,327,734 B2  2/2008  Yi et al.
(Continued)

FOREIGN PATENT DOCUMENTS

CN   1437368 A   8/2003
CN   1204724 C   6/2005
(Continued)

OTHER PUBLICATIONS

English Translation of PCT International Preliminary Report on Patentability, including (1) Notification Concerning Transmittal of International Preliminary Report on Patentability and (2) Written Opinion of the International Searching Authority, for PCT/CN2009/073882, mailed Sep. 29, 2011 (6 pages).

(Continued)

*Primary Examiner* — Jae Y Lee
*Assistant Examiner* — Alan Lindenbaum
(74) *Attorney, Agent, or Firm* — Clark & Elbing LLP

(57) ABSTRACT

The present invention discloses a UE (User Equipment) and a method of the UE for receiving downlink data to avoid the occurrence of mistakes when the UE receives the downlink data. The method comprises the following steps: during the reestablishment, in the process of transmitting Service Data Units (SDU) to a Packet Data Convergence Protocol (PDCP) entity from a Radio Link Control (RLC) entity in the UE, if the PDCP entity judges that the PDCP Sequence Number (SN) of the received PDCP Protocol Data Unit (PDU) which includes the SDU satisfies the report condition, the PDCP PDU is received and the SDU included in the PDCP PDU is submitted to the upper layer entity, wherein the report condition is: PDCP SN=(Last_Submitted_PDCP_RX_SN+1)% (Maximum_PDCP_SN+1).

8 Claims, 2 Drawing Sheets

(56) References Cited

U.S. PATENT DOCUMENTS

| | | |
|---|---|---|
| 2003/0007490 A1 | 1/2003 | Yi et al. |
| 2003/0210676 A1 | 11/2003 | Wu |
| 2004/0151154 A1 | 8/2004 | Wu |
| 2008/0037548 A1 | 2/2008 | Yi et al. |
| 2009/0003283 A1* | 1/2009 | Meylan .................. 370/331 |
| 2009/0034476 A1* | 2/2009 | Wang et al. ............ 370/331 |

FOREIGN PATENT DOCUMENTS

| | | |
|---|---|---|
| CN | 1210971 C | 7/2005 |
| CN | 1247002 C | 3/2006 |
| WO | WO 2008/140028 A1 | 11/2008 |

OTHER PUBLICATIONS

English Translation of PCT International Search Report for PCT/CN2009/073882, mailed Dec. 31, 2009 (4 pages).

Supplementary European Search Report for European Patent Application No. 09841750.4, dated May 29, 2012 (4 pages).

Chinese Examination Report for Chinese Application No. 200910128998.2, dated May 6, 2013 (6 pages).

Communication pursuant to Article 94(3) EPC for European Patent Application No. 09841750.4, dated Feb. 15, 2013 (4 pages).

LG Electronics, "Addition of a duplicate discard window and recording function," 3GPP Draft; R2-082185, 3rd Generation Partnership Propect (3GPP), Mobile Competence Centre; Apr. 28, 2008 (13 Pages), XP050139959.

3rd Generation Partnership Project; Technical Specification Group Radio Access Network; Evolved Universal Terrestrial Radio Access (E-UTRA); Packet Data Convergence Protocol (PDCP) specification (Release 8), 3GPP TS 36.323 V8.4.0, Dec. 2008 (24 pages).

Motorola, "PDCP Handover Handling," 3GPP TSG-RAN WG2 Meeting #61, Shenzhen, China, Mar. 31-Apr. 4, 2008 (3 pages).

* cited by examiner

The submission of No. 0, 1, 2, 3, 4, 5, and 6 PDCP PDU will be delayed

No. 8, 9, 10, 11, 12, 13, and 14 PDCP PDU will be discarded

USER EQUIPMENT AND METHOD OF USER EQUIPMENT FOR RECEIVING DOWNLINK DATA

CROSS-REFERENCE TO RELATED APPLICATIONS

This application is the U.S. National Stage filing under 35 U.S.C. §371 of International Application No. PCT/CN2009/073882, filed Sep. 11, 2009, which claims benefit of Chinese Patent Application No. 200910128998.2, filed Mar. 17, 2009.

FIELD OF THE INVENTION

The present invention belongs to the long term evolution (LTE) system, in particular relates to a UE (User Equipment) and a method of the UE for receiving downlink data.

BACKGROUND OF THE INVENTION

The LTE system is the newest 3GPP mobile communication system in which the air access technology of the 3G is improved and enhanced, namely LTE air interface protocol. As shown in FIG. 1, the system comprises a physical layer (the L1 in FIG. 1), a media access control (MAC) layer, a radio link control (RLC) layer and a packet data convergence protocol (PDCP) layer, which are respectively in the UE and an evolved NodeB (eNB). Herein, the services provided by the RLC entity in the RLC layer mainly comprise: the transmission service of confirmation data (including PDCP PDU submission success instruction), the transmission service of non-confirmed data, in-order submission (excluding the circumstance of lower layer entities reestablishment) and de-duplication (excluding the circumstance of lower layer entities reestablishment); and the PDCP entity in the PDCP layer not only provides the services of header compression, encryption and integrity protection, but also provide necessarily the in-order submission and de-duplication services under the circumstance of lower layer entities reestablishment.

The reestablishment of the RLC entity in the RLC and the MAC entity in the MAC layer is called as lower layer entities reestablishment for short. The reason why the lower layer entities are reestablished includes handover, radio resource control (RRC) connection reestablishment and so on. The eNB transmits the downlink data to the UE, and the L1 layer inside the UE reports the received data layer by layer up to the service layer (application layer). When the RRC instructs the RLC entity to perform the lower layer entities reestablishment, the RLC entity will submit in-order RLC service data unit (SDU) as much as possible to the PDCP entity. After the RLC SDU is subjected to the procedures of compression, integrity protection (for the signaling), encryption and adding with PDCP Head, the data packet obtained is the PDCP PDU (Protocol Data Unit). When the RLC entity is in acknowledgement mode (AM), the format of the PDCP PDU is as shown in FIG. 2, wherein D/C (Data/Control) is a data/control switch; PDCP SN is the sequence number; the PDCP SN (cont.) in the second byte is the PDCP SN which has not been sent out yet in the first byte; R (reserved) is a reserved bit; and the data refers to SDU. Each PDCP PDU submitted by the RLC entity is associated with a certain count value COUNT. The COUNT is divided into two parts: the high position part is called as hyper frame number (HFN) which is maintained at both ends (sending end and receiving end); the low position part is the PDCP SN which refers to the PDCP SN field fixed in the PDCP Header. When a PDCU PDU is received, the value of COUNT associated with the PDU is required to decode and decompress the ultimate SDU from the PDCP PDU. The HFN is exported from the RX_HFN state variable maintained by the UE.

The present protocol maintains the correct HFN of the PDCP PDU through a mechanism based on windows. The window mechanism is as follows: supposing that the range of the PDCP SN is $0 \leq SN \leq Maximum\_PDCP\_SN$, the size of receiving windows Reordering_ Window=(Maximum_PDCP_SN+1)/2, for example, as for the PDCP SN of 12 bits, Maximum_PDCP_SN=4095, Reordering_Window=2048. Supposing that the PDCP SN of the PDCP PDU submitted at the latest to the upper layer entity is Last_Submitted_PDCP_RX_SN, the PDCP SN of the PDCP PDU received next will be Next_PDCP_RX_SN. To be short, the lower boundary of the receiving window is Next_PDCP_RX_SN, and the upper boundary generally equals to Next_PDCP_Rx_SN+2048. When the PDCP PDU in the window is received, the HFN of the PDCP PDU is determined according to the position relationship between the Next_PDCP_Rx_SN and the PDCP SN of the received PDCP PDU, and then is decrypted, decompressed and put in the buffer memory; while the PDU beyond the receiving window is discarded.

After the reestablishment of the lower layer entities, the PDCP entity receives the PDCP PDU submitted by the lower layer entities during the reestablishment of the lower layer entities. If the PDCP SN of the PDCP PDU equals to Last_Submitted_PDCP_RX_SN+1, then starting from the PDU, a whole serial of continuous SDUs are submitted to the upper layer entity, and the Last_Submitted_PDCP_RX_SN is refreshed; and if the SN of the PDCP PDU does not equal to Last_Submitted_PDCP_RX_SN+1, the PDCP PDU will be temporally stored in the buffer memory, and when the PDCP PDU with the PDCP SN equaling to Last_Submitted_PDCP_RX_SN+1 is received next time, there is an opportunity for the PDCP PDU stored in the buffer memory to be submitted to the upper layer entity. If after the reestablishment of the lower layer entities the buffer memory still has the PDCP PDU having not been submitted, then there will be an opportunity for the PDCP PDU not submitted yet to be submitted to the upper layer entity after the reestablishment of the lower layer entities.

For example, if Last_Submitted_PDCP_RX_SN equals to 99, the lower boundary of the window is 100, and the upper boundary is 100+2048=2148. If the SN of the received PDCP PDU equal to 100, the SDU in the PDU is reported, and the upper and lower boundaries of the window are modified as [101, 2149]; if the PDCP SN of the received PDCP PDU equals to 102 which is within the boundary range of the window, the PDCP PDU is temporarily stored in the buffer memory, and the PDCP PDU with the PDCP SN of 102 will be reported after the PDCP PDU with the SN equaling to 100 and 101 are received and reported; and if the PDCP SN of the received PDCP PDU equals to 2400 which is beyond the boundary range of the window, the PDCP PDU will be discarded.

However, under the circumstance that when Last_Submitted_PDCP_RX_SN=Maximum_PDCP_SN during the reestablishment of the lower layer entities, all the PDCP PDUs with SN equaling to 0, 1, . . . , Reordering_Window−1 stored in the buffer memory can not be submitted, at the same time, the value of Last_Submitted_PDCP_RX_SN can not be refreshed forwardly, and PDCP PDUs received subsequently in the range of Reordering_Window+$1 \leq SN < 2Reordering\_Window$ will be discarded, which results in that the receipt of the downlink data fails.

SUMMARY OF THE PRESENT INVENTION

The present invention is put forward aiming to provide a UE (user equipment) and a method of the user equipment for receiving downlink data to avoid the occurrence of mistakes when the UE receives the downlink data.

In order to solve the above-mentioned problem, the present invention provides a method of the user equipment for receiving downlink data. The method comprises: during the reestablishment, in the process of transmitting service data unit (SDU) to a packet data convergence protocol (PDCP) entity in the PDCP layer from a radio link control (RLC) entity in the RLC layer in the UE, the SDU being configured as the downlink data received from the eNB before the reestablishment; and the PDCP entity judging whether the PDCP serial number (SN) of the received PDCP protocol data unit (PDU) which includes the SDU satisfies the report condition or not, wherein if yes, it submits the SDU included in the PDCP PDU to an upper layer entity, wherein the report condition is:

PDCP SN=(Last_Submitted_PDCP_RX_SN+1)%
(Maximum_PDCP_SN+1)

wherein, Last_Submitted_PDCP_RX_SN refers to the PDCP SN of the PDCP PDU which the latest SDU submitted to the upper layer entity belongs to; Maximum_PDCP_SN refers to the maximum value of the PDCP SN; and the % refers to modular operation.

Further, after submitting the SDU to the upper layer entity, the PDCP entity searching other PDCP PDU successive with the PDCP SN of the PDCP PDU which the SDU belongs to in the buffer memory of the PDCP entity, wherein if succeed, it continues to submit the SDU in the searched PDCP PDU to the upper layer; and updating the Last_Submitted_PDCP_RX_SN to the PDCP SN of the PDCP PDU which the latest SDU submitted to the upper layer entity belongs to.

Further, if judging that the PDCP SN of the received PDCP PDU which includes the SDU does not satisfy the report condition but satisfies the saving condition, the PDCP entity storing the PDCP PDU in the buffer memory of the PDCP entity, the saving condition being as follows:

(Last_Submitted_PDCP_RX_SN+1)%(Maximum_P-
DCP_SN+1)<PDCP SN≤(Last_Submitted_PD-
CP_RX_SN+1)%(Maximum_PDCP_SN+1)+
(Maximum_PDCP_SN+1)/2.

Further, when judging that the PDCP SN of the received PDCP PDU which includes the SDU does not satisfy the report condition and the saving condition, the PDCP entity discarding the PDCP PDU.

Further, submitting by the PDCP entity the SDU in the PDCP PDU of which the PDCP SN is the minimum value to the upper layer entity if the PDCP entity receives the PDCP PDU of which the PDCP SN is the minimum value, when the PDCP SN of the PDCP PDU which the latest SDU submitted to the upper layer entity belongs to is the maximum value.

A method of a user equipment for receiving downlink data comprises:

step (a), receiving by a packet data convergence protocol (PDCP) entity in the PDCP layer of the user equipment (UE) a PDCP protocol data unit (PDU) which includes the service data unit (SDU) from a correlative RLC entity in the radio link control (RLC) layer of the UE, wherein the PDCP SN of the PDCP PDU is x; judging whether the PDCP PDU is submitted to the PDCP entity during the reestablishment of RLC entity and MAC entity or not, wherein if yes, it performs step (b), otherwise it performs step (d), wherein the SDU is the downlink data received from an eNB before the reestablishment;

step (b), judging by the PDCP entity whether x satisfies the report condition or not, namely judging whether x equals to (Last_Submitted_PDCP_RX_SN+1)%(Maximum_PDCP_SN+1) or not, wherein if yes, it performs step (d), otherwise it performs step (c);

step (c), judging by the PDCP entity whether x satisfies the saving condition or not, namely judging whether x satisfies following formulas, wherein if x satisfies the following formulas, the PDCP PDU is stored in the buffer memory of the PDCP, otherwise the PDCP PDU is discarded:

(Last_Submitted_PDCP_RX_SN+1)%(Maximum_P-
DCP_SN+1)<x≤(Last_Submitted_PD-
CP_RX_SN+1)%(Maximum_PDCP_SN+1)+
(Maximum_PDCP_SN+1)/2;

step (d), extracting by the PDCP entity the SDU from the PDU, and submitting the SDU to the upper layer entity, and updating Last_Submitted_PDCP_RX_SN to x; and step (e), searching by the PDCP entity other PDCP PDU successive with the x in the buffer memory, wherein if succeed, it continues to submit the SDU in the searched PDCP PDU to the upper layer and updating Last_Submitted_PDCP_RX_SN to the PDCP SN of the PDCP PDU which the latestly submitted SDU belongs to; and if the PDCP entity does not find any PDCP PDU which satisfies the above-mentioned condition in the buffer memory, it returns to step (a), wherein Last_Submitted_PDCP_RX_SN refers to the PDCP SN of the PDCP PDU which the latest SDU submitted to the upper layer entity belongs to; Maximum_PDCP_SN refers to the maximum value of the PDCP SN; and the % refers to modular operation.

In order to solve the above-mentioned problem, the present also provides a user equipment, comprising a packet data convergence protocol (PDCP) entity in the PDCP layer and a radio link control (RLC) entity in the RLC layer sequentially connected, wherein the RLC entity is configured to forward the received service data unit (SDU) to the PDCP entity;

the PDCP entity is configured to judge the PDCP SN of the received PDCP protocol data unit (PDU) which includes the SDU satisfies the report condition or not, wherein if yes, it submits the SDU included in the PDCP PDU to the upper layer entity, wherein the report condition is:

PDCP SN=(Last_Submitted_PDCP_RX_SN+1)%
(Maximum_PDCP_SN+1)

wherein, Last_Submitted_PDCP_RX_SN refers to the PDCP SN of the PDCP PDU which the latest SDU submitted to the upper layer entity belongs to; Maximum_PDCP_SN refers to the maximum value of the PDCP SN; and % refers to modular operation.

Further, the PDCP entity is further configured to search other PDCP PDU successive with the PDCP SN of the PDCP PDU which the SDU belongs to in the buffer memory of the PDCP entity after submitting the SDU to the upper layer entity, wherein if succeed, it continues to submit the SDU in the searched PDCP PDU to the upper layer and update Last_Submitted_PDCP_RX_SN to the PDCP SN of the PDCP PDU which the latest SDU submitted to the upper layer entity belongs to.

Further, the PDCP entity is further configured to store the PDCP PDU in the buffer memory of the PDCP entity when the PDCP entity judges that the PDCP SN of the received PDCP PDU which includes the SDU does not satisfy the report condition but satisfies the saving condition, wherein the saving condition is as follows:

(Last_Submitted_PDCP_RX_SN+1)%(Maximum_P-
DCP_SN+1)<PDCP SN≤(Last_Submitted_PD-
CP_RX_SN+1)%(Maximum_PDCP_SN+1)+
(Maximum_PDCP_SN+1)/2.

Further, the PDCP entity is further configured to discard the PDCP PDU when the PDCP entity judges that the PDCP SN of the received PDCP PDU which includes the SDU does not satisfy the report condition and the saving condition.

The technical solution provided by the present invention can ensure that the UE avoids during the reestablishment of the lower layer entities of the PDCP entity the problem that the PDCP PDU is submitted in delay time and the problem that the UE fails to receive the downlink PDCP PDU. Particularly for the circumstance that Last_Submitted_PDCP_RX_SN=Maximum_PDCP_SN, the present technical solution is especially effective.

DETAILED DESCRIPTION

The main conception of the present invention is as follows: during the reestablishment, in the process of transmitting the SDU to the PDCP entity in the PDCP layer from the RLC entity in the RLC layer in the UE, such SDUs are the downlink data received from the eNB before the reestablishment, wherein if the PDCP entity judges that the PDCP SN of the received PDCP PDU which includes the SDU satisfies the report condition, the PDCP PDU is received and the SDU included in the PDCP PDU is submitted to the upper layer entity, wherein the report condition is:

PDCP SN=(Last_Submitted_PDCP_RX_SN+1)%(Maximum_PDCP_SN+1).

After submitting the SDU to the upper layer entity, the PDCP entity searches other PDCP PDU successive with the PDCP SN in the buffer memory of the PDCP entity. If succeed, the PDCP entity continues to submit the SDU in the searched PDCP PDU to the upper layer; and the Last_Submitted_PDCP_RX_SN is updated to be the PDCP SN of the PDCP PDU which the latest SDU submitted to the upper layer entity belongs to.

If the PDCP entity judges that the PDCP SN of the received PDCP PDU which includes the SDU does not satisfy the report condition but satisfies the saving condition, then the PDCP PDU will be received and buffered in the buffer memory of the PDCP entity, wherein the saving condition is as follows:

(Last_Submitted_PDCP_RX_SN+1)%(Maximum_PDCP_SN+1)<PDCP SN≤(Last_Submitted_PDCP_RX_SN+1)%(Maximum_PDCP_SN+1)+(Maximum_PDCP_SN+1)/2.

In the above, Last_Submitted_PDCP_RX_SN refers to the PDCP SN of the PDCP PDU which the latest SDU submitted to the upper layer entity belongs to (or called as the PDCP SN associated with the SDU); Maximum_PDCP_SN refers to maximum serial number, i.e., the maximum value of the PDCP SN; and the % refers to modular operation.

When the PDCP entity judges that the PDCP SN of the received PDCP PDU which includes the SDU does not satisfy the report condition and the saving condition, then the PDCP PDU will be discarded.

When the PDCP SN of the PDCP PDU which the latest SDU submitted to the upper layer entity belongs to is the maximum value, if the PDCP entity receives the PDCP PDU of which the PDCP SN is the minimum value, then the PDCP entity submits the SDU in the PDCP PDU of which the PDCP SN is the minimum value to the upper layer entity.

The present invention will be detailed hereafter in connection with the drawings.

Figure 1:
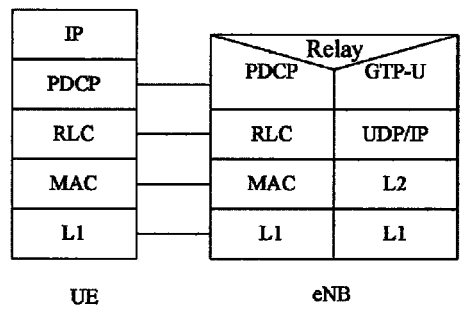
FIG. 1 is a schematic diagram of the architecture of existing LTE wireless access network.
Figure 2:
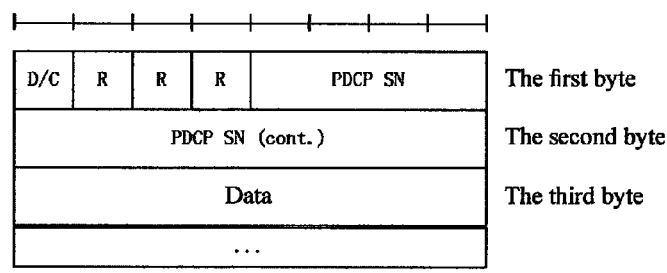
FIG. 2 is a schematic diagram of the format of existing PDCP PDU.
Figure 3:
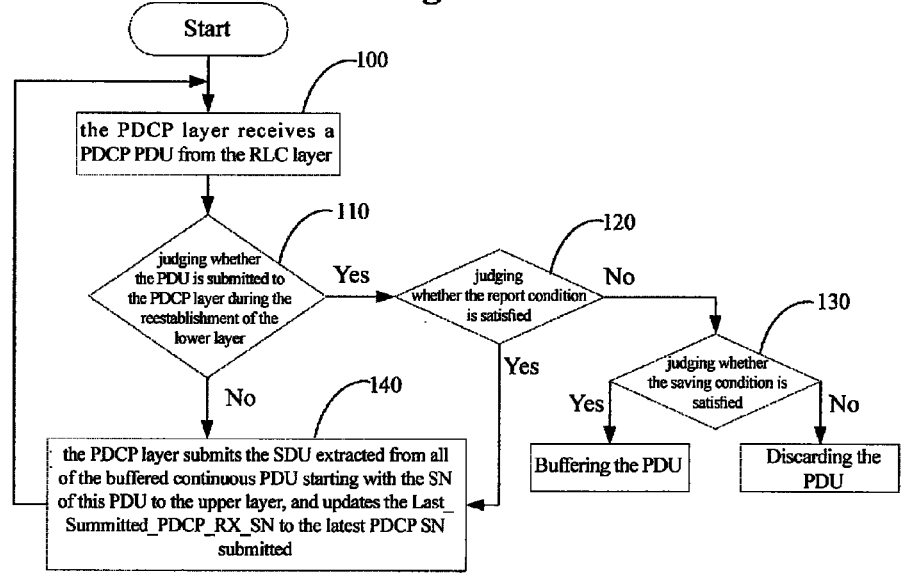
FIG. 3 is a flowchart of receiving downlink data in the embodiment.

Supposing that the PDCP SN in the PDCP PDU which is received and submitted to the upper layer entity at the latest by the PDCP entity is Last_Submitted_PDCP_RX_SN, and the PDCP SN in the currently received PDCP PDU is x, when the correlative RLC entity reports the downlink data to the PDCP entity, as shown in FIG. 3, the processing flow of the PDCP entity comprises the steps as follows:

Step 100, the PDCP entity receives a PDCP PDU from the correlative RLC entity, wherein the PDCP SN of the PDCP PDU is x;

Step 110, it is judged whether the PDCP PDU is submitted to the PDCP entity during the reestablishment of lower layer entities or not wherein if yes, it performs step 120, otherwise it performs step 140;

The step 110 can be completed by the control plane RRC of the PDCP entity on the basis of prior art;

Step 120, it is judged whether the x satisfies the report condition or not, namely judging whether x equals to (Last_Submitted_PDCP_RX_SN+1)%(Maximum_PDCP_SN+1) or not wherein if yes, it performs step 140, otherwise it performs step 130;

Step 130, it is judged whether the x satisfies the saving condition or not, namely judging whether x satisfies the following formulas:

(Last_Submitted_PDCP_RX_SN+1)%(Maximum_PDCP_SN+1)<x≤(Last_Submitted_PDCP_RX_SN+1)%(Maximum_PDCP_SN+1)+(Maximum_PDCP_SN+1)/2, wherein if x satisfies the formulas, the PDCP PDU is stored in the buffer memory of the PDCP; otherwise the PDCP PDU is discarded;

Step 140, the PDCP entity extracts the SDU from the PDCP PDU, submits the SDU to the upper layer entity, and updates Last_Submitted_PDCP_RX_SN to x;

Afterwards, the PDCP entity searches other PDCP PDU (x+1, x+2 . . . ) successive with the value x in the buffer memory. If succeed, the PDCP entity continues to submit the SDU in the searched PDCP PDU to the upper layer; and updates Last_Submitted_PDCP_RX_SN to the PDCP SN of the PDCP PDU which the latest SDU submitted belongs to. If PDCP entity can not find any PDCP PDU which satisfies the above-mentioned condition in the buffer memory, it returns to step 100.

If the PDCP PDU is not submitted during the reestablishment of lower layer entities, the PDCP entity submits to the upper layer entity the SDUs which have successive PDCP SN and are starting from x. If the buffer memory still has the PDCP PDU with the PDCP SN less than x, then all the PDCP PDUs with the PDCP SN less than x in the buffer memory are submitted to the upper layer entity simultaneously.

During the reestablishment of the lower layer entities, the PDCP entity needs to guarantee that the SN associated with the SDU submitted to the upper layer entity is successive.

The technical solution of the present invention will be explained by taking Maximum_PDCP_SN=15 as an example. When Maximum_PDCP_SN=15, Reordering_Window=8.

Figure 4A:
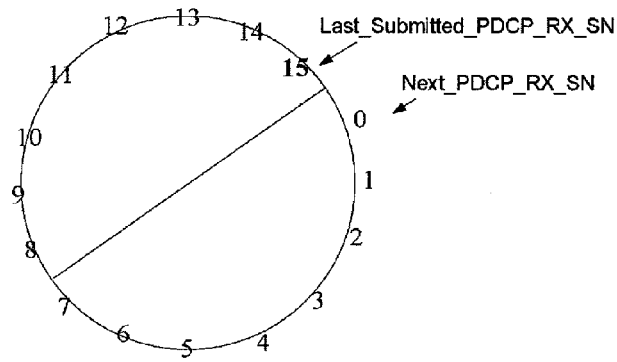
FIG. 4a is a schematic diagram of the initial situation in the embodiment.
Figure 4B:
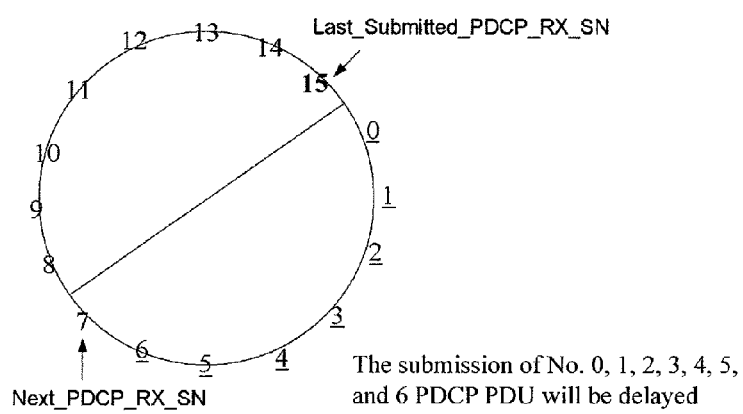
FIG. 4b is a schematic diagram of delayed submission in the embodiment.

Example 1 the scene of avoiding delayed submission is as shown in FIG. 4a and FIG. 4b.

FIG. 4a is the initial situation in which when the reestablishment of the lower layer entities starts, it is in the state of Last_Submitted_PDCP_RX_SN==Maximum_PDCP_SN, and the No. 15 PDCP PDU (the PDCP PDU No. 15) has already been submitted. When the No. 0 PDCP PDU is received, it is judged that the PDCP SN of this PDCP PDU satisfies the report condition, namely it is judged the PDCP SN of the PDCP PDU satisfies the following formula: PDCP SN=(Last_Submitted_PDCP_RX_SN+1)%(Maximum_PDCP_SN+1), and at this time the No. 0 PDCP PDU is submitted and the state variables are updated to: Last_Submitted_PDCP_RX_SN=0, Next_PDCP_Rx_SN=1. If No. 1-6 PDUs are received continuously, as shown in FIG. 4b, these PDUs will be submitted successively.

However, according to existing criterion, because the current SN 0 does not satisfy the lower boundary of the window Last_Submitted_PDCP_RX_SN+1=16, the PDCP entity will not submit the No. 0 PDU even if the No. 0 PDU is received, and all the No. 0-6 PDUs received will be stored in the buffer memory. After the reestablishment process is over, when the PDCP PDU with PDCP SN=7 is received, the buffered No. 0-6 PDUs can be submitted to the upper layer together with the No. 7 PDU, which results in that the submission is delayed and the burden of the buffer memory is increased.

Example 2 the scene of preventing the UE from failing to receive downlink data is as shown in FIG. 4a and FIG. 4b.

Figure 4C:
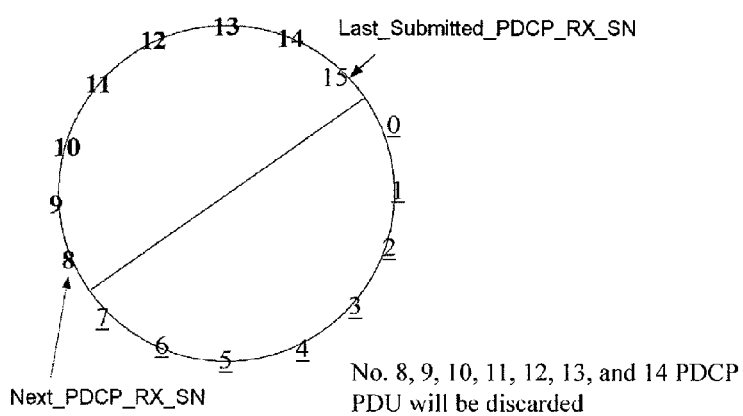
FIG. 4c is a schematic diagram showing that the receipt of the data is failed in the embodiment.

FIG. 4a is the initial situation in which when the reestablishment of the lower layer entities starts, it is in the state of Last_Submitted_PDCP_RX_SN==Maximum_PDCP_SN, and the No. 15 PDCP PDU has already been submitted. When the No. 0 PDCP PDU is received, it is judged that the PDCP SN of the PDCP PDU satisfies the report condition, namely it is judged that the PDCP SN of the PDCP PDU satisfies the following formula: PDCP SN=(Last_Submitted_PDCP_RX_SN+1)%(Maximum_PDCP_SN+1), the UE will submit the No. 0 PDCP PDU, and at the same time update the state variables to Last_Submitted_PDCP_RX_SN=0, Next_PDCP_Rx_SN=1; and then continue to receive and submit the NOs. 1, 2, 3, 4, 5, 6, 7, 8, 9, 10, 11, 12, 13, 14 PDCP PDUs, as shown in FIG. 4c, so as to avoid the fault of receiving the downlink data during the reestablishment of the lower layer entities.

However, according to existing criterion, because the current SN of the PDCP PDU does not satisfy the lower boundary of the window Last_Submitted_PDCP_RX_SN+1=16, the No. 0-7 PDCP PDUs are not submitted even if these No. 0-7 PDCP PDUs are received, and all the No. 0-7 PDUs will be stored in the buffer memory. Last_Submitted_PDCP_RX_SN at this time still equals to Maximum_PDCP_SN. If the reestablishment of the lower layer entities is completed at this time, the Nos. 8-14 PDCP PDUs received thereafter will be discarded because the No. 0-7 PDCP PDUs have already been buffered, and the PDCP status report is not initiated to require the eNB to resend the No. 8-14 PDCP PDUs. If the PDCP entity does not receive No. 0 PDCP PDU any longer after the reestablishment is over, then all the Nos. 0-14 PDCP PDUs can not be submitted, resulting in the serious problem that the UE fails to receive the downlink data.

As a matter of course, the present invention can have the other various embodiments. Without deviating from the spirit and essence of the present invention, those skilled in the art may have various relevant changes and variations according to the present invention. But the relevant changes and variations are all included in the protection scope of the claims of the present invention.

For example, that the minimum SN is 0 is only an example of the embodiment for illuminating the present invention. In the other embodiments, the minimum SN can also be set as other values.

INDUSTRIAL APPLICABILITY

The technical solution provided by the present invention can ensure that the UE avoids during the reestablishment of the lower layer entities of the PDCP entity the problem that the PDCP PDU is delayed to be submitted and the problem that the UE fails to receive the downlink PDCP PDU. Particularly under the circumstance that Last_Submitted_PDCP_RX_SN==Maximum_PDCP_SN, the technical solution is especially effective.

What is claimed is:

1. A method of a user equipment for receiving downlink data, comprising:
   during the reestablishment, in the process of transmitting service data unit (SDU) to a packet data convergence protocol (PDCP) entity in the PDCP layer from a radio link control (RLC) entity in the RLC layer in the UE, the SDU being configured as the downlink data received from the eNB before the reestablishment; and
   the PDCP entity judging whether the PDCP serial number (SN) of the received PDCP protocol data unit (PDU) which includes the SDU satisfies the report condition or not, wherein if yes, it submits the SDU included in the PDCP PDU to an upper layer entity, wherein the report condition is:

PDCP SN=(Last_Submitted_PDCP_RX_SN+1)% (Maximum_PDCP_SN+1)

wherein, Last_Submitted_PDCP_RX_SN refers to the PDCP SN of the PDCP PDU which the latest SDU submitted to the upper layer entity belongs to; Maximum_PDCP_SN refers to the maximum value of the PDCP SN; and the % refers to modular operation;
   if judging that the PDCP SN of the received PDCP PDU which includes the SDU does not satisfy the report condition but satisfies the saving condition, the PDCP entity storing the PDCP PDU in the buffer memory of the PDCP entity, the saving condition being as follows:

(Last_Submitted_PDCP_RX_SN+1)%(Maximum_PDCP_SN+1)<PDCP SN≤(Last_Submitted_PDCP_RX_SN+1)%(Maximum_PDCP_SN+1)+ (Maximum_PDCP_SN+1)/2.

2. The method according to claim 1, further comprising:
   after submitting the SDU to the upper layer entity, the PDCP entity searching other PDCP PDU successive with the PDCP SN of the PDCP PDU which the SDU belongs to in the buffer memory of the PDCP entity, wherein if succeed, it continues to submit the SDU in the searched PDCP PDU to the upper layer; and updating the Last_Submitted_PDCP_RX_SN to the PDCP SN of the PDCP PDU which the latest SDU submitted to the upper layer entity belongs to.

3. The method according to claim 1, further comprising:
when judging that the PDCP SN of the received PDCP PDU which includes the SDU does not satisfy the report condition and the saving condition, the PDCP entity discarding the PDCP PDU.

4. The method according to claim 1, further comprising:
submitting by the PDCP entity the SDU in the PDCP PDU of which the PDCP SN is the minimum value to the upper layer entity if the PDCP entity receives the PDCP PDU of which the PDCP SN is the minimum value, when the PDCP SN of the PDCP PDU which the latest SDU submitted to the upper layer entity belongs to is the maximum value.

5. A method of a user equipment for receiving downlink data, comprising:

step (a), receiving by a packet data convergence protocol (PDCP) entity in the PDCP layer of the user equipment (UE) a PDCP protocol data unit (PDU) which includes the service data unit (SDU) from a correlative RLC entity in the radio link control (RLC) layer of the UE, wherein the PDCP SN of the PDCP PDU is x; judging whether the PDCP PDU is submitted to the PDCP entity during the reestablishment of RLC entity and MAC entity or not, wherein if yes, it performs step (b), otherwise it performs step (d), wherein the SDU is the downlink data received from an eNB before the reestablishment;

step (b), judging by the PDCP entity whether x satisfies the report condition or not, namely judging whether x equals to (Last_Submitted_PDCP_RX_SN+1)%(Maximum_PDCP_SN+1) or not, wherein if yes, it performs step (d), otherwise it performs step (c);

step (c), judging by the PDCP entity whether x satisfies the saving condition or not, namely judging whether x satisfies following formulas, wherein if x satisfies the following formulas, the PDCP PDU is stored in the buffer memory of the PDCP, otherwise the PDCP PDU is discarded:

(Last_Submitted_PDCP_RX_SN+1)%(Maximum_PDCP_SN+1)<x≤(Last_Submitted_PDCP_RX_SN+1)%(Maximum_PDCP_SN+1)+(Maximum_PDCP_SN+1)/2;

step (d), extracting by the PDCP entity the SDU from the PDU, and submitting the SDU to the upper layer entity, and updating Last_Submitted_PDCP_RX_SN to x; and step (e), searching by the PDCP entity other PDCP PDU successive with the x in the buffer memory, wherein if succeed, it continues to submit the SDU in the searched PDCP PDU to the upper layer and updating Last_Submitted_PDCP_RX_SN to the PDCP SN of the PDCP PDU which the latestly submitted SDU belongs to; and if the PDCP entity does not find any PDCP PDU which satisfies the above-mentioned condition in the buffer memory, it returns to step (a), wherein Last_Submitted_PDCP_RX_SN refers to the PDCP SN of the PDCP PDU which the latest SDU submitted to the upper layer entity belongs to; Maximum_PDCP_SN refers to the maximum value of the PDCP SN; and the % refers to modular operation.

6. A user equipment, comprising a packet data convergence protocol (PDCP) entity in the PDCP layer and a radio link control (RLC) entity in the RLC layer sequentially connected, wherein:

the RLC entity is configured to forward the received service data unit (SDU) to the PDCP entity;

the PDCP entity is configured to judge the PDCP SN of the received PDCP protocol data unit (PDU) which includes the SDU satisfies the report condition or not, wherein if yes, it submits the SDU included in the PDCP PDU to the upper layer entity, wherein the report condition is:

PDCP SN=(Last_Submitted_PDCP_RX_SN+1)%(Maximum_PDCP_SN+1)

wherein, Last_Submitted_PDCP_RX_SN refers to the PDCP SN of the PDCP PDU which the latest SDU submitted to the upper layer entity belongs to; Maximum_PDCP_SN refers to the maximum value of the PDCP SN; and % refers to modular operation;

the PDCP entity is further configured to store the PDCP PDU in the buffer memory of the PDCP entity when the PDCP entity judges that the PDCP SN of the received PDCP PDU which includes the SDU does not satisfy the report condition but satisfies the saving condition, wherein the saving condition is as follows:

(Last_Submitted_PDCP_RX_SN+1)%(Maximum_PDCP_SN+1)<PDCP SN≤(Last_Submitted_PDCP_RX_SN+1)%(Maximum_PDCP_SN+1)+(Maximum_PDCP_SN+1)/2.

7. The user equipment according to claim 6, wherein:
the PDCP entity is further configured to search other PDCP PDU successive with the PDCP SN of the PDCP PDU which the SDU belongs to in the buffer memory of the PDCP entity after submitting the SDU to the upper layer entity, wherein if succeed, it continues to submit the SDU in the searched PDCP PDU to the upper layer and update Last_Submitted_PDCP_RX_SN to the PDCP SN of the PDCP PDU which the latest SDU submitted to the upper layer entity belongs to.

8. The user equipment according to claim 6, wherein:
the PDCP entity is further configured to discard the PDCP PDU when the PDCP entity judges that the PDCP SN of the received PDCP PDU which includes the SDU does not satisfy the report condition and the saving condition.

* * * * *